May 9, 1967 D. G. TIMMS ET AL 3,318,967
DEHYDROGENATION OF HYDROCARBONS
Filed Feb. 24, 1964
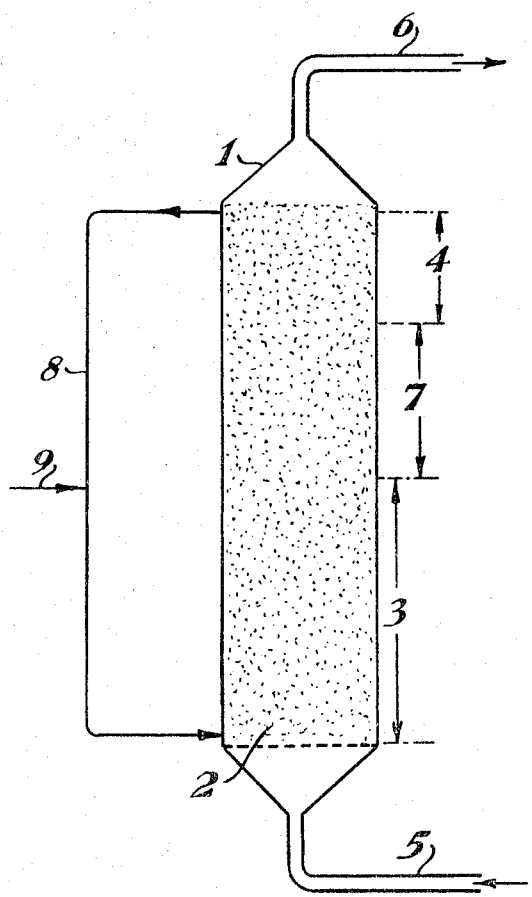
Inventors:
Donald George Timms
and
Roger William Hedge
By Baldwin & Wight
Attorneys

3,318,967
DEHYDROGENATION OF HYDROCARBONS
Donald George Timms and Roger William Hedge, Hampshire, England, assignors to The International Synthetic Rubber Company Limited, Hampshire, England, a corporation of the United Kingdom
Filed Feb. 24, 1964, Ser. No. 346,673
Claims priority, application Great Britain, Feb. 28, 1963, 8,157/63
10 Claims. (Cl. 260—680)

This invention relates to the dehydrogenation of mono-olefins to form di-olefins and is concerned particularly with the dehydrogenation of butenes and isopentenes in the manufacture of butadiene and isoprene respectively.

It is well known that olefins may be made by dehydrohalogenation of halo-paraffins and similarly di-olefins may be prepared by dehydrohalogenation of a mono-halo-olefin or a di-halo-paraffin. The removal of a hydrogen and halogen group from the molecule may be effected by treatment with potash or by heating the compound to a sufficiently high temperature, usually in the presence of a suitable catalyst.

One process for the production of butadiene is disclosed in U. S. specification No. 2,379,697 and involves the thermal dehydrochlorination of dichlorobutane. More recently a process has been disclosed in U. S. specification No. 2,890,253 in which iodine is used to effect the dehydrogenation of butene or butane to yield butadiene. In the latter process the hydrogen iodide produced is oxidized to yield iodine which is then available for recycling. This process has been shown to give high yields of butadiene at high selectivity. The high cost of iodine is however a discouraging factor.

We have found that high conversions and selectivities are possible in a continuous process for the dehydrogenation of mono-olefins using chlorine or bromine to effect the dehydrogenation. In such a process a gaseous mixture containing mono-olefins oxygen, steam and chlorine or bromine or compounds of chlorine or bromine is fed through a catalyst bed containing a transition metal oxide at 350–600° C. The halogen emerges in the effluent gas almost entirely as the hydride. This process is attractive inasmuch as the need to use costly iodine is avoided and the halogen may be recovered and recycled. However, the formation of highly corrosive gases leads to severe problems in plant construction. We have therefore developed a process in which the presence of free halogen or halogen hydride outside of the catalyst bed is obviated.

According to the present invention a process for the dehydrogenation of a mono-olefin, comprises passing a gaseous mixture containing the mono-olefin, molecular oxygen and steam through a first zone and then through a second zone of a fluidised or moving plug bed comprising a basic halide of iron, cobalt or manganese the temperature in the first zone being from 350° to 700° C. and the temperature in the second zone being low enough to allow the halogen produced and metal oxide formed in the first zone to react to reform the basic halide of iron, cobalt or manganese but above the dew point of the gas mixture; withdrawing dehydrogenated gases and recycling the basic halide to the first zone.

The molecular oxygen in the gaseous mixture is advantageously provided as air. The process may be applied to any mono-olefin, but in practice the most usual olefins will normally be butenes, pentenes and hexenes. It is extremely advantageous when the mono-olefin is a butene. Preferably, the temperature in the first zone should be between 400° and 600° C.

The basic halide is preferably a chloride or a bromide and examples of suitable halides are basic iron bromide or basic manganese bromide. We define the term basic halide as meaning an intimate mixture or compound of the metal oxide halide. These compounds are preferably supported on a carrier, for example silica gel, activated alumina or pumice.

The basic halide need not be introduced into the reactor per se but can be introduced in the form of iron, cobalt or manganese oxide in conjunction with an alkaline earth metal halide. As in the case where the basic halide itself is used the compounds are preferably supported on a carrier.

The fluidised or moving plug bed of halide may advantageously comprise more than two zones. When this is the case, the first zone and every succeeding alternate zone will be hot zones, i.e., they will operate at a temperature from 350° to 700° C., preferably 400°–600° C. The second zone and every succeeding alternate zone will be cool zones, i.e., to allow basic transition metal halide to reform. Preferably, the last zone is a cool zone. In the case when more than one hot zone and more than one cool zone are used it is preferably that all the hot zones should be at the same temperature and all the cool zones are at the same temperature. Halide that is reformed in a cool zone is preferably recycled to a hot zone immediately preceding a cool zone.

An example of a fluidized bed system is illustrated in the accompanying schematic drawing.

Referring to the drawing a reactor 1 contains a fluidised bed 2 of catalyst having a single hot zone 3 and a single cool zone 4. The gaseous feed of hydrocarbons oxygen and steam enter the reactor through a pipe 5 and the products leave the reactor through a pipe 6. There is an inevitable intermediate zone 7 in which back mixing from the cool zone into the hot zone takes place. The intermediate zone 7 is kept as small as possible to minimise back mixing by keeping the diameter of the reactor 1 small compared with its length or by suitable baffling or other zoning technique. The fluidised bed 2 can be arranged to flow bodily upward at just the rate of circulation of cooled halide from the cool zone to the hot zone through transfer pipe 8 to minimise the back mixing effect. A halide make up line 9 can be provided in the transfer pipe 8.

With the concentration of air, butenes and steam mentioned in the examples there is no danger of explosion and the components of the mixture may be mixed in any order. When higher air-butenes ratios are used, however, it is desirable to mix the butenes with steam and then mix this mixture with air.

*Example 1*

A catalyst was prepared by precipitation iron hydroxide from a solution of ferric bromide with ammonia. The precipitate was dried without washing and was heated to 250° C. until all ammonium compounds were removed. The product was powdered and used in the form of a fluidised bed, hot zone at 450° C., cold zone at 100° C. Butenes, oxygen (as air) and steam were fed in the molar ratios 2:1:7.5.

The yield of butadiene was 67% with a selectivity of 86.5%.

*Example 2*

A catalyst was prepared by soaking silica gel in 0.5 M ferris bromide solution, drying the gel at 160° C. and powdering the product which was used as a fluidised bed with a hot zone at 420° C. and a cold zone at 100° C.

With the feedstock as described in Example 1 the yield of butadiene was 61% with a selectivity of 89%.

*Example 3*

The catalyst was prepared by soaking silica gel in 0.5 manganese bromide solution, drying the gel at 160° C. and powdering the product which was used as a fluidised bed with a hot zone at 510° C., and a cold zone at 100° C.

With the feedstock as described in Example 1 the yield of butadiene was 54% with a selectivity of 78%.

*Example 4*

The conditions were as in Example 3 but 2 methyl butene-2 was used in place of butenes. The yield of isoprene was 59% with a selectivity of 72%.

What is claimed is:

1. A process for the dehydrogenation of a mono-olefin to form a diolefin comprising (1) passing a gaseous mixture containing the mono-olefin, molecular oxygen and steam through a moving plug bed of a basic halide selected from the group consisting of iron, cobalt and manganese basic halides, said gaseous mixture passing first through a first zone of said bed in which the temperature is from 350° C. to 700° C. and secondly through a second zone of said bed in which the temperature is above the dew point of the gas mixture and below the critical temperature of the reformation of said basic halide, (2) withdrawing gases from the bed and (3) recycling basic halide from the second zone to the first one.

2. A process as claimed in claim 1 in which the temperature for the first zone is from 400° C. to 600° C.

3. A process as claimed in claim 1 in which the temperature from the second zone is from 100° C. to 400° C.

4. A process as claimed in claim 1 in which the mono-olefin is selected from the group consisting of butenes, pentenes, and hexenes.

5. A process as claimed in claim 1 in which the basic halide is a basic chloride.

6. A process as claimed in claim 1 in which the basic halide is a basic bromide.

7. A process for the dehydrogenation of a mono-olefin to form a diolefin comprising (1) passing a gaseous mixture containing mono-olefin, molecular oxygen and steam through at least one moving plug bed of a basic halide selected from the group consisting of iron, cobalt and manganese basic halides said gaseous mixture passing through a plurality of first zones of said bed in which the temperature is from 350° C. to 700° C. and through a plurality of second zones of said bed in which the temperature is above the dew point of the gas mixture and below the critical temperature for the reformation of said basic halide, the first and second zones alternating with each other, (2) withdrawing gas from the bed and (3) recycling basic halide from each second zone to the first zone immediately preceding it.

8. A process as claimed in claim 7 in which the temperature in each first zone is from 400° C. to 600° C.

9. A process as claimed in claim 7 in which the temperature in each second zone is from 100° C. to 400° C.

10. A process as claimed in claim 7 in which the last zone of the moving plug bed is a second zone.

References Cited by the Examiner

UNITED STATES PATENTS

| | | | |
|---|---|---|---|
| 3,106,590 | 10/1963 | Bittner | 260—673.5 |
| 3,130,241 | 4/1964 | Baijle et al | 260—677 |
| 3,168,584 | 2/1965 | Nager | 260—673 |
| 3,205,280 | 9/1965 | Wattimena | 260—680 |
| 3,207,806 | 9/1965 | Bajars | 260—680 |

DELBERT E. GANTZ, *Primary Examiner.*

G. E. SCHMITKONS, *Assistant Examiner.*